United States Patent
Kendall et al.

(10) Patent No.: US 7,778,912 B2
(45) Date of Patent: Aug. 17, 2010

(54) SYSTEM FOR APPRAISING A FINANCIAL PRODUCT

(75) Inventors: Errol O. Kendall, Atlanta, GA (US); James C. Brooks, Jr., Marietta, GA (US)

(73) Assignee: Efficient Markets Corporation, Atlanta, GA (US)

( * ) Notice: Subject to any disclaimer, the term of this patent is extended or adjusted under 35 U.S.C. 154(b) by 1301 days.

(21) Appl. No.: 09/756,906

(22) Filed: Jan. 10, 2001

(65) Prior Publication Data

US 2002/0091613 A1   Jul. 11, 2002

(51) Int. Cl.
G06Q 40/00 (2006.01)
(52) U.S. Cl. .......................... 705/37; 705/38
(58) Field of Classification Search .............. 705/37–38
See application file for complete search history.

(56) References Cited

U.S. PATENT DOCUMENTS

| | | | |
|---|---|---|---|
| 5,291,398 A | 3/1994 | Hagan | |
| 5,375,055 A | 12/1994 | Togher et al. | |
| 5,655,085 A | 8/1997 | Ryan et al. | |
| 5,704,045 A * | 12/1997 | King et al. | 705/35 |
| 5,758,328 A | 5/1998 | Giovannoli | 705/26 |
| 5,839,118 A | 11/1998 | Ryan et al. | |
| 5,966,693 A | 10/1999 | Burgess | |
| 5,987,434 A | 11/1999 | Libman | |
| 5,991,744 A | 11/1999 | Discresce | |
| 6,119,093 A | 9/2000 | Walker et al. | |
| 6,233,566 B1 | 5/2001 | Levine et al. | |
| 6,332,129 B1 | 12/2001 | Walker et al. | 705/26 |
| 6,456,979 B1 | 9/2002 | Flagg | 705/4 |
| 6,684,189 B1 | 1/2004 | Ryan et al. | |
| 2001/0023404 A1 * | 9/2001 | Ogawa et al. | 705/4 |
| 2002/0007332 A1 | 1/2002 | Johnson et al. | |

FOREIGN PATENT DOCUMENTS

| | | |
|---|---|---|
| KR | 2000-0050079 | 8/2000 |
| WO | WO 91/20071 | 12/1991 |
| WO | WO 02/29650 | 4/2002 |

OTHER PUBLICATIONS

Bragg Associates, Inc., *Acturial Counselling Report*, 1995, pp. 1-10.
Bragg Associates, Inc., *About the Bragg Index Methodology*, 1995, pp. 1-3.
Bragg Associates, Inc., *Bragg Index*, May 10, 1995, vol. 1, pp. 1-2.

(Continued)

*Primary Examiner*—Thu Thao Havan
(74) *Attorney, Agent, or Firm*—McKenna Long & Aldridge LLP (57) ABSTRACT

A method and system of appraising a financial product includes receiving a request for a financial product and information about a party requesting the financial product; preparing a bid solicitation for the financial product based on the request and information and transmitting the bid solicitation to a plurality of product carriers; a plurality of product carriers submitting initial proposals for providing the financial product; generating ratings for the initial proposals, respectively; and generating appraisals for the initial proposals; and informing the product carriers of the decision.

10 Claims, 6 Drawing Sheets

OTHER PUBLICATIONS

Physician's Money Digiest, *Don't Get Ripped Off When Buying Life Insurance*, Feb. 1996, pp. 29-30.

Martin Weiss' Safe Money Report, *A new collapse in long-term bonds will make 1994 look like a picnic. Wait for yields of 9% or better before buying*, Jun. 14, 1995, Issue #254, pp. 1-2.

Consumer Reports, *Time to Think About Life Insurance*, Jul. 1993, pp. 431-603.

The Bragg Index and Statusquote, *Differentiating KeyCorp's Life Insurance Business*, Atlanta, Georgia, Feb. 17, 1997, pp. 1-13.

National Underwriter, *The Life Industry Needs a Product-Rating System*, Apr. 17, 1996, pp. 11-12.

National Underwriter, *Black Box Alien's Been Sighted on Annuity Block*, Jul. 15, 1996, pp. 16.

National Underwriter, *Product Ratings May Be Closer Than You Think*, Oct. 28, 1996, pp. 23.

"Rate of Return on Differential Premiums for Selected Participating Life Insurance Contracts" by Phyllis Schiller Myers and S. Travis Pritchett. The Journal of Risk and Insurance, vol. 50, No. 4 (Dec. 1983), pp. 569-586.

"The Rate of Return on Universal Life Insurance" by Antony C. Cherin and Robert C. Hutchins. The Journal of Risk and Insurance, vol. 54, No. 4. (Dec. 1987), pp. 691-711.

"Life Insurance Management Issues" by Stephen W. Forbes. The Journal of Risk and Insurance, vol. 54, No. 3 (Sep. 1987), pp. 603-613.

"Determinants of Universal Life Insurance Cash Values" by James M. Carson. The Journal of Risk and Insurance, vol. 63, No. 4, Symposium on Catasrophic Risk. (Dec. 1996), pp. 673-681.

"Effects of Relationship Marketing on Satisfaction, Retention, and Prices in the Life Insurance Industry" by Lawrence A. Crosby and Nancy Stephens. Journal of Marketing Research, vol. 24, No. 4 (Nov. 1987).

"Classifying Financial Distress in the Life Insurance Industry," by Ran BarNiv and Robert A. Hershbarger. The Journal of Risk and Insurance, vol. 57, No. 1 (Mar. 1990), pp. 110-136.

Consumer Reports, Glasses; Life Insurance: Did Your Agent Lie to You?; Aug. 1993, pp. 525-539.

Consumer Reports, Survival Guide to Supermarkets; Sep. 1993; pp. 555,595-603.

\* cited by examiner

SYSTEM FOR APPRAISING A FINANCIAL PRODUCT

BACKGROUND OF THE INVENTION

1. Field of the Invention

The present invention relates to an automated system for appraising value to consumers of a financial product, and more particularly, to a computer-based value appraising system.

2. Discussion of the Related Art

The financial services industry consists of industry segments such as insurance and banking. In turn, the insurance industry consists of industry segments such as life insurance, health insurance, and property and casualty insurance.

The life insurance industry includes product markets such as term life insurance, universal life insurance, variable life insurance, annuities, joint products, viatical settlements, preneed insurance, and long-term care insurance. Insurance carriers sell life insurance products through various distribution channels such as captive agents, independent agents, banks, affinity groups, and financial planners.

The present life insurance product markets for both insurance product proposals and in-force insurance products are inefficient. For insurance product proposals, the problem stems from: (1) an inadequate exchange of information between consumers and insurers during the selling process and, (2) the absence of a real-time auction market in which to price life insurance product proposals. Inefficient product markets for in-force insurance products stem from the absence of a system for measuring an insurance product's performance while that product is in-force.

An inadequate exchange of relevant and available information between consumers and insurers during the selling process is a significant source of product market inefficiency. Typically, consumers often do not receive relevant and available information necessary to make an informed purchase decision. Also, insurers frequently do not receive relevant and available information on the consumer and current market pricing necessary to tailor their proposals for optimal product performance and pricing. Such inefficient transmission of information results in product market inefficiency. Such product market inefficiency in the insurance industry adversely affects consumers and insurance companies.

Moreover, many life insurance products have complex features that consumers do not understand. Consumers' lack of insurance product knowledge opens the door to misleading sales practices such as twisting, churning, and vanishing premiums. Product "gimmickry," such as lapse basing, preys on a consumer's inability to detect its existence. Recent, widely publicized accounts of race-based underwriting indicate that market conduct problems can go undetected for years by consumers, insurance company managements, and insurance industry regulators. Insurance industry regulators have attempted to enforce market conduct standards. Insurance companies have sought to curtail sales abuses. Their efforts have not solved the problem.

Market conduct problems occur regardless of an insurance company's financial strength. Favorable financial ratings are no indication of an insurer's compliance with market conduct standards. Independent rating firms evaluate an insurer's claims paying ability. They do not rate the products sold by insurers. The life insurance industry has no product rating system that appraises a proposed insurance product's total value to the consumer.

These and other market conduct problems point to the need for a system that assists the consumer in appraising a proposed insurance product's value.

The absence of a real-time auction market in which to price life insurance product proposals is a source of product market inefficiency. Currently, whether life insurance products are sold on the Internet or sold offline, the products are sold in a "fixed-priced" market. Typically, during the sales process, consumers and insurers cannot obtain real-time, market pricing information for products that are tailored to individual consumer needs. Thus, both consumers and insurers are deprived of opportunities to improve pricing before the sale closes. Consequently, some insurance products may be priced too high. In other cases, product prices may be too low.

Some insurers presently post fixed pricing information for standard products on the Internet, making it easier for consumers to compare prices for certain products. The Internet has made available more pricing information to consumers than ever before. However, while price comparisons allow the consumer to seek the lowest price for such fixed-price products, these price comparisons provide no other information to allow for an appraisal of the total value proposition.

Similarly, existing policyholders have no means for evaluating the performance of their in-force insurance policies. No system exists in the marketplace for appraising an in-force product's continuing value to the consumer.

Moreover, price is only one element in appraising an insurance product's total value proposition. No available systems provide consumers with information other than price to facilitate informed purchase decisions. Consumers need a system that appraises the total value proposition of life insurance product proposals. Such a system would lead to stronger product market efficiency.

In addition, even though present systems allow for price shopping on the Internet by consumers, from the insurer's perspective, such price shopping commoditizes insurance products. Thus, insurers are forced to compete on price alone and cannot differentiate products that provide other "non-price" value for consumers. Consequently, the attractiveness of the industry's structure declines, competitor rivalry increases, weak product substitutes proliferate, and entry barriers become lower across product markets. These structural changes squeeze margins and erode industry-wide profitability.

SUMMARY OF THE INVENTION

Accordingly, the present invention is directed to an evaluating system for a financial service product that substantially obviates one or more of the problems due to limitations and disadvantages of the related art.

An advantage of the present invention is to provide an on-line, real-time system for evaluating a proposed financial service product.

An advantage of the present invention is to provide an on-line, real-time system for evaluating an in-force financial service product.

An advantage of the present invention is to provide an on-line, real-time system for evaluating a replacement financial service product.

Another advantage of the present invention is to provide a system that creates efficient product markets for the benefit of the life insurance industry and its customers.

Another advantage of the present invention is to provide a system that enables insurance companies and insurance distribution channels to better serve their customers and to improve industry-wide profitability.

Another advantage of the present invention is to provide a system to improve product pricing by pricing insurance products in an auction-style market.

Another advantage of the present invention is to provide a system for evaluating the current performance of an in-force insurance product.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of appraising a financial product includes the steps of receiving a request for a financial product and information about a party requesting the financial product; preparing a bid solicitation for the financial product based on the request and information and transmitting the bid solicitation to a plurality of product carriers; at least one of the plurality of product carriers providing a proposal for providing the financial product; automatically generating a numerical rating corresponding to each proposal and providing the numerical rating to the corresponding product carrier; allowing the plurality of product carriers to revise the proposals based on the numerical rating; the product carriers providing a final proposal; and generating an appraisal for each of the final proposals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention relates to an evaluating system for a financial service product under consideration for purchase, the ongoing value of a financial service product already owned, or replacing a financial service product. In addition, either as a separate process or in conjunction with this process, the product value appraisal system of the present invention enables an on-line, real-time auction process for pricing financial service products. The present invention provides a system for appraising a life insurance product's total value proposition to the consumer. The product value appraisal system operates preferably via the Internet, but may be configured to work off-line or via a closed network or Intranet. The system is configured to support all categories of insurance transactions including, business-to-business, business-to-consumer, and business-to-employee. The system appraises insurance product proposals as well as insurance products that are in-force and replacement product proposals.

Figure 1:
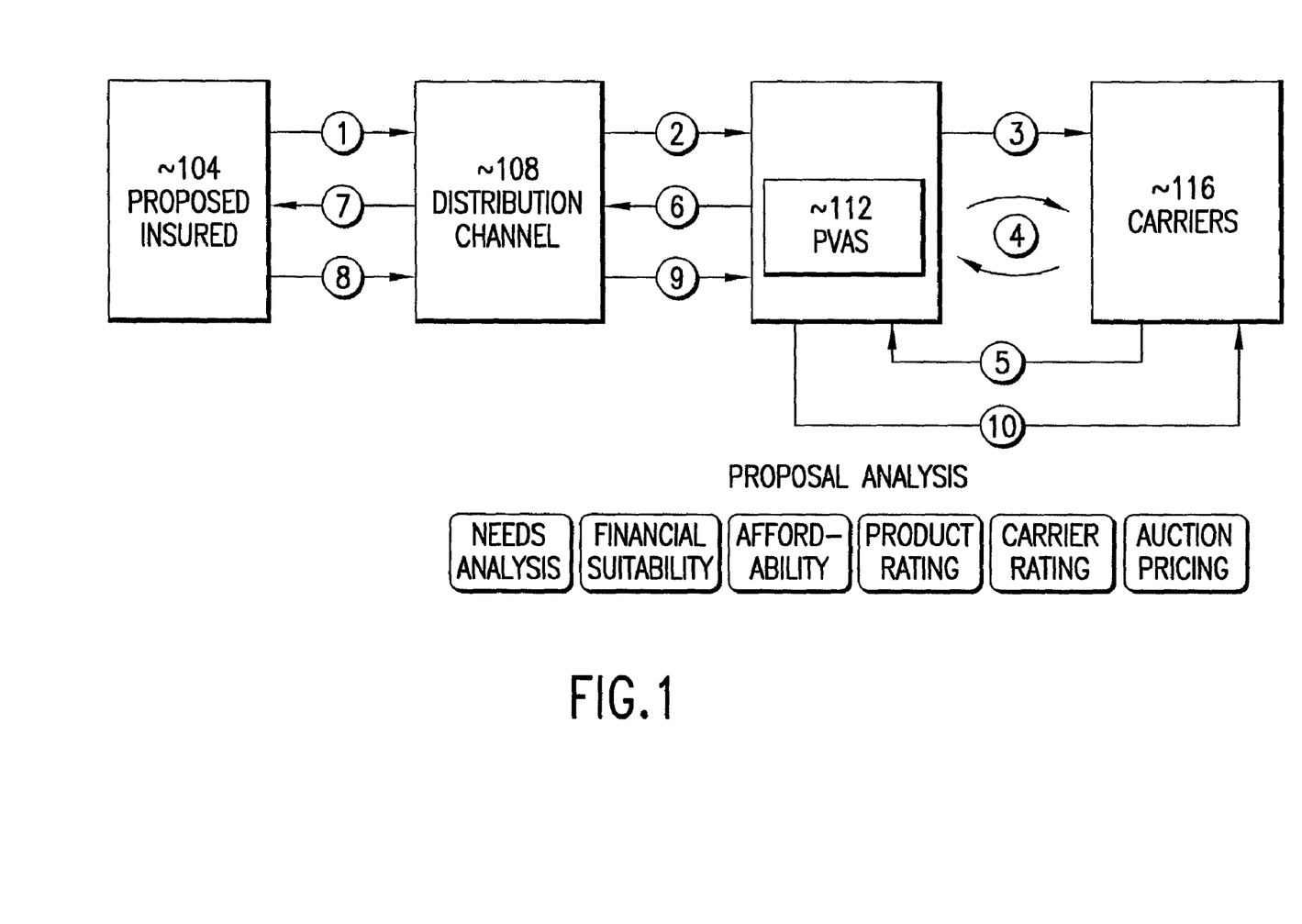
FIG. 1 is a block diagram that illustrates a preferred embodiment of the present invention.

As shown in FIG. 1, the product value appraisal system of the present invention simultaneously solicits, prices, and rates insurance policy proposals. FIG. 1 illustrates a "business-to-business" transaction.

A party seeking a financial product, the proposed insured 104, requests a financial product, such as an insurance product, through a distribution channel 108 that sells such products to consumers, as illustrated by step 1 in FIG. 1. In the case in which an interested party seeks insurance, the proposed insured 104 also provides the distribution channel 108 with information necessary to appraise the total value proposition to the proposed insured 104. This information includes the risk profile of the proposed insured 104 for the product, e.g., a life insurance policy, to be evaluated. Demographic and risk profile data include, for example, the proposed insured's age, sex, smoking habits, basic income and net worth information. Information necessary to analyze the proposed insured's needs and financial suitability also is transmitted.

Next, the distribution channel 108 transmits to a product value appraisal system ("PVAS") 112 information provided by the proposed insured 104, including the demographic and risk profile information as inputs to the product value appraisal system 112, as illustrated by step 2 of FIG. 1. The type of product being considered as well as the financial need of the end consumer or the proposed insured that will be met will also be transmitted.

Then, the product value appraisal system 112 initiates bidding and/or invites proposals from interested product providers or carriers 116 by sending a proposed opening bid or invitation for proposal to a participating insurance carrier 116, as illustrated by step 3 of FIG. 1. The opening bid provided by the product value appraisal system 112 may include an opening price with a minimum product rating.

After initiating bidding or inviting proposals, the product value appraisal system 112 proceeds in an on-line, real-time, iterative process with the insurance carriers 116, as illustrated by step 4 of FIG. 1. The insurance policy proposals solicited by the product value appraisal system 112 are tailored to the proposed insured's risk profile, individual needs, and financial suitability. Upon receipt of a bid or proposal from a participating insurance carrier 116, the product value appraisal system 112 reviews each bid or proposal and rates the bid or proposal and the pricing of each bid or proposal.

With each product proposal, the insurance carrier will transmit information about the price and benefits of its product along with identifying information about itself. This data includes data about the product's proposed benefits and price on both a guaranteed and illustrated basis, and information about the insurance company proposing the product. Product data include the proposed premiums to be paid and the proposed benefits to be provided, both distinguished between guaranteed amounts and illustrated amounts that depend on assumptions about the future. The insurance company information includes data that quantifies the financial strength of the insurance company. The product value appraisal system 112 will use appropriate actuarial assumptions, such as mortality information specific to the end customer's risk profile, and traditional actuarial present value methodology to determine a numeric rating of the benefits offered in light of the proposed price. A numeric rating will also be assigned to the financial strength of the product provider as well as to the suitability and affordability of the proposed product to the customer's circumstances. These three ratings will then be weighed to arrive at an overall rating of the customer value proposition.

Thus, the product value appraisal system 112 simultaneously solicits, prices, and rates, insurance policy proposals from insurance carriers. Soliciting, rating and pricing insurance policy proposals are conducted in an iterative process. This process is conducted in real-time and preferably continues until optimal product pricing and product ratings have been obtained.

The product value appraisal system 112 continues to provide feedback to the insurance carriers, including rating information and whether the carrier's current bid or proposal meets the customer's minimum requirements. The insurance carrier can then provide a new bid or proposal, taking into consideration the feedback from the product value appraisal system 112. If the insurance carrier believes that its proposal is final, e.g., that it cannot submit a more competitive bid, it provides a final bid or proposal to the product value appraisal system 112.

Insurance carriers transmit their final product proposals to the product value appraisal system 112, as illustrated by step 5 of FIG. 1. Proposals received from insurance carriers must meet or exceed minimum product ratings established at the outset by the product value appraisal system 112. The ratings reflect the insurance product proposal's total value proposition to the proposed insured. The total value proposition of a life insurance product proposal takes into account, among others, the proposed insured's needs, financial suitability, affordability, and risk profile. It also reflects such detailed information as the insurance product proposal, information on the insurer's financial strength, and information on current market prices.

The product value appraisal system 112 transmits or outputs rated product proposals to the distribution channel, as illustrated by step 6 of FIG. 1. This output includes an appraisal of the entire value proposition for the proposed insured. The appraisal takes such form as a numerical index, an alphabetic grade, or a descriptive phrase such as "superior," "above average," "average," "below-average," or "unacceptable." These results are communicated to the proposed insured by the distribution channel, as illustrated by step 7 of FIG. 1. Appropriate explanatory comments may accompany this information.

Next, the proposed insured makes a purchase decision and communicates that decision to the distribution channel, as illustrated by step 8 of FIG. 1. The proposed insured's purchase decision flows back to the insurance carriers via the distribution channel and the product value appraisal system, as illustrated by steps 9 and 10 of FIG. 1.

Figure 2:
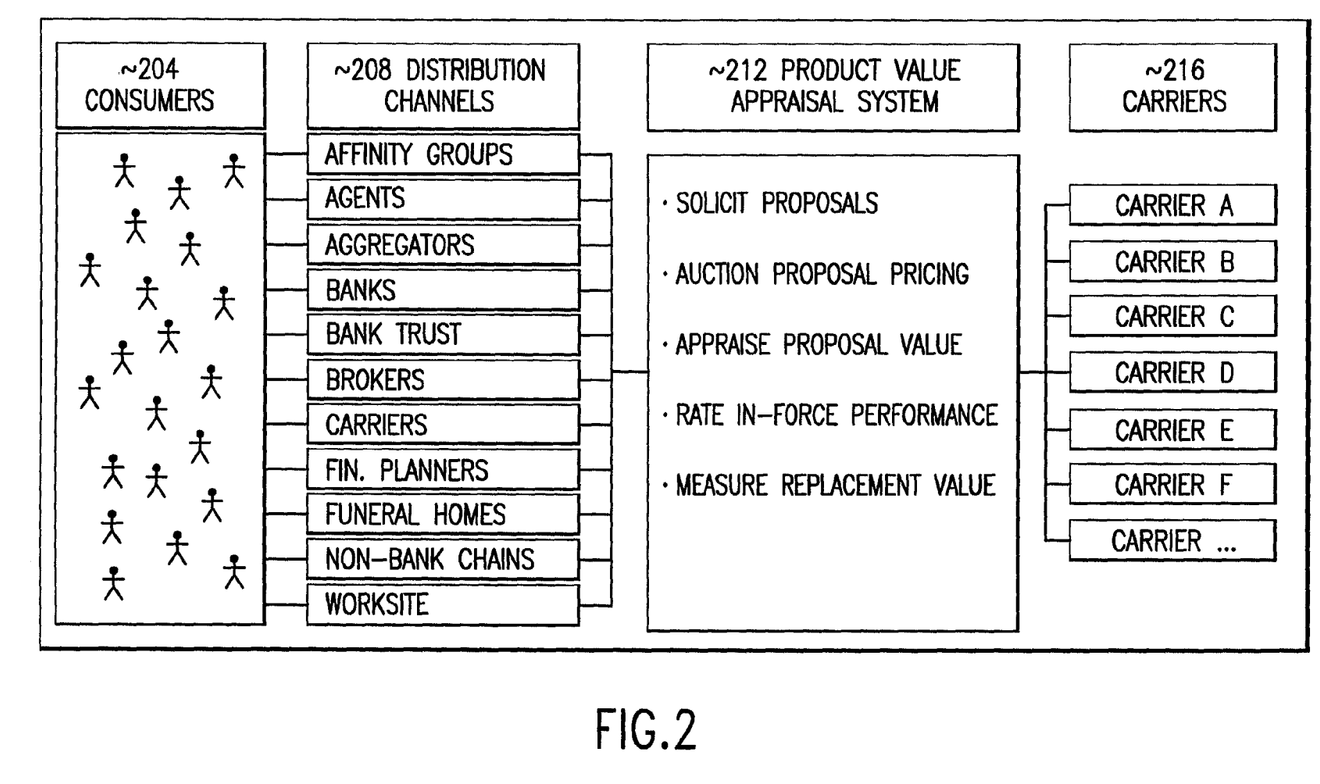
FIG. 2 is a block diagram that illustrates parties involved in a business transaction according to the preferred embodiment of the present invention.

FIG. 2 illustrates a more detailed view of the parties involved in the valuation system. Insurance carriers 216 (Ins. Co. A, B, C, D, E, F, . . . ) represent competing insurance carriers available to propose insurance products to meet customer requirements according to the present invention. The product value appraisal system 212 for soliciting, pricing, and rating insurance product proposals in a real-time, iterative process is shown. The product value appraisal system 212 may also rate the performance of in-force insurance policies and measures the value proposition of replacing in-force insurance policies. Distribution channels 208 include, among others, aggregators, banks, non-bank institutions, bank trusts, insurance agents, brokers, financial planners and advisors, funeral homes, place of employment, affinity groups and other carriers.

Figure 3:
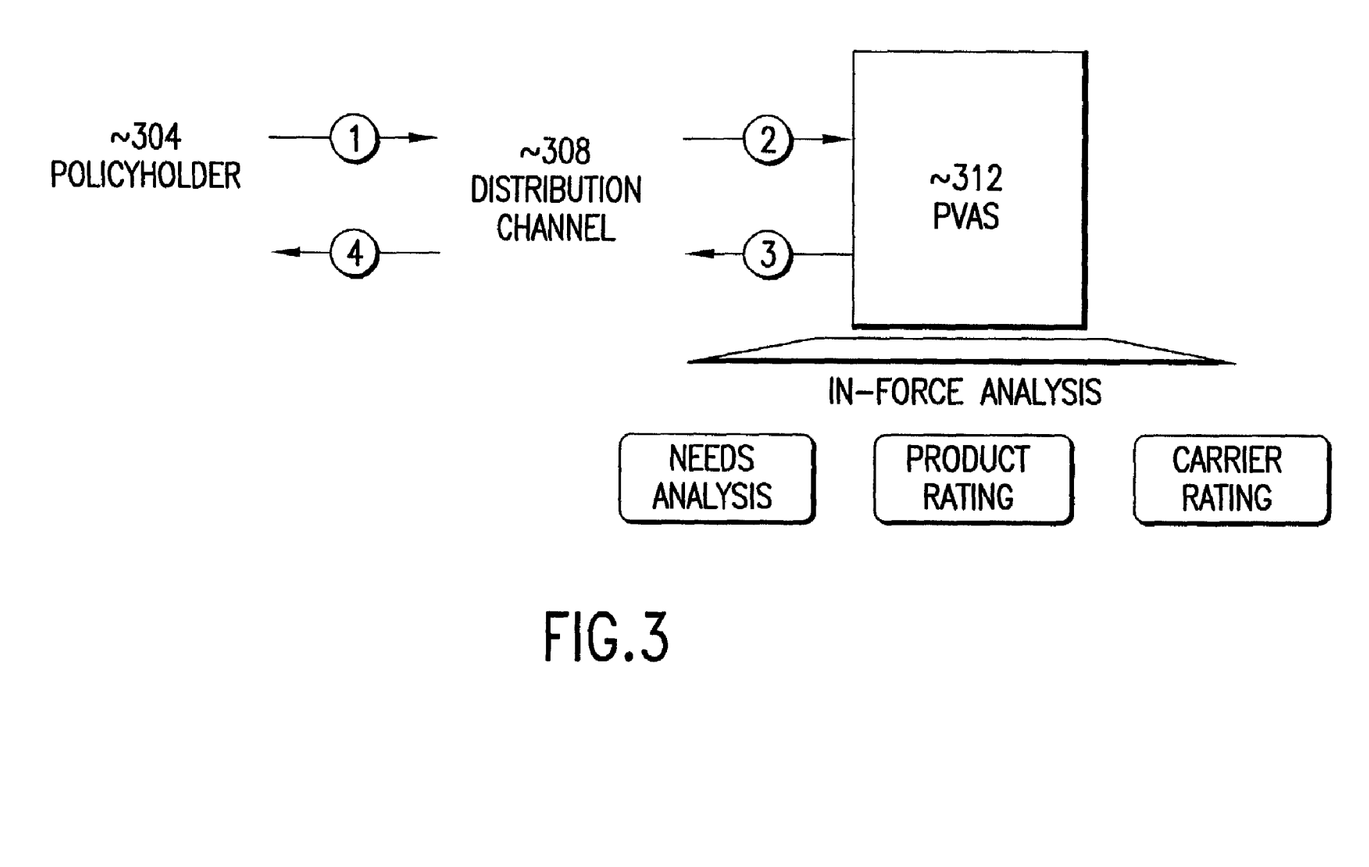
FIG. 3 is a block diagram that illustrates an embodiment of the present invention appraising the continuing value proposition to the policyholder of an in-force insurance policy.

In addition, another embodiment of the present invention provides a method of valuing in-force insurance policies and rates the continuing value proposition to the policyholder. As shown in FIG. 3, the product value appraisal system 312 collects, processes and uses available information on the insurance policyholder, the in-force policy, and the insurance company that issued the in-force policy to rate the performance of the in-force policy.

Further, if requested by the policyholder, the product value appraisal system 312 determines the value proposition involved in replacing the in-force policy. If a valuation of a replacement policy is requested, the process proceeds in a manner similar to that process described with regard to FIG. 1. For example, the product value appraisal system 312 solicits, auctions and rates replacement insurance policy proposals to compare their value proposition to that of the in-force policy. Second, the product value appraisal system 312 calculates whether replacing the in-force policy would create value for the policyholder, particularly in view of the existing in-force policy.

Figure 4:
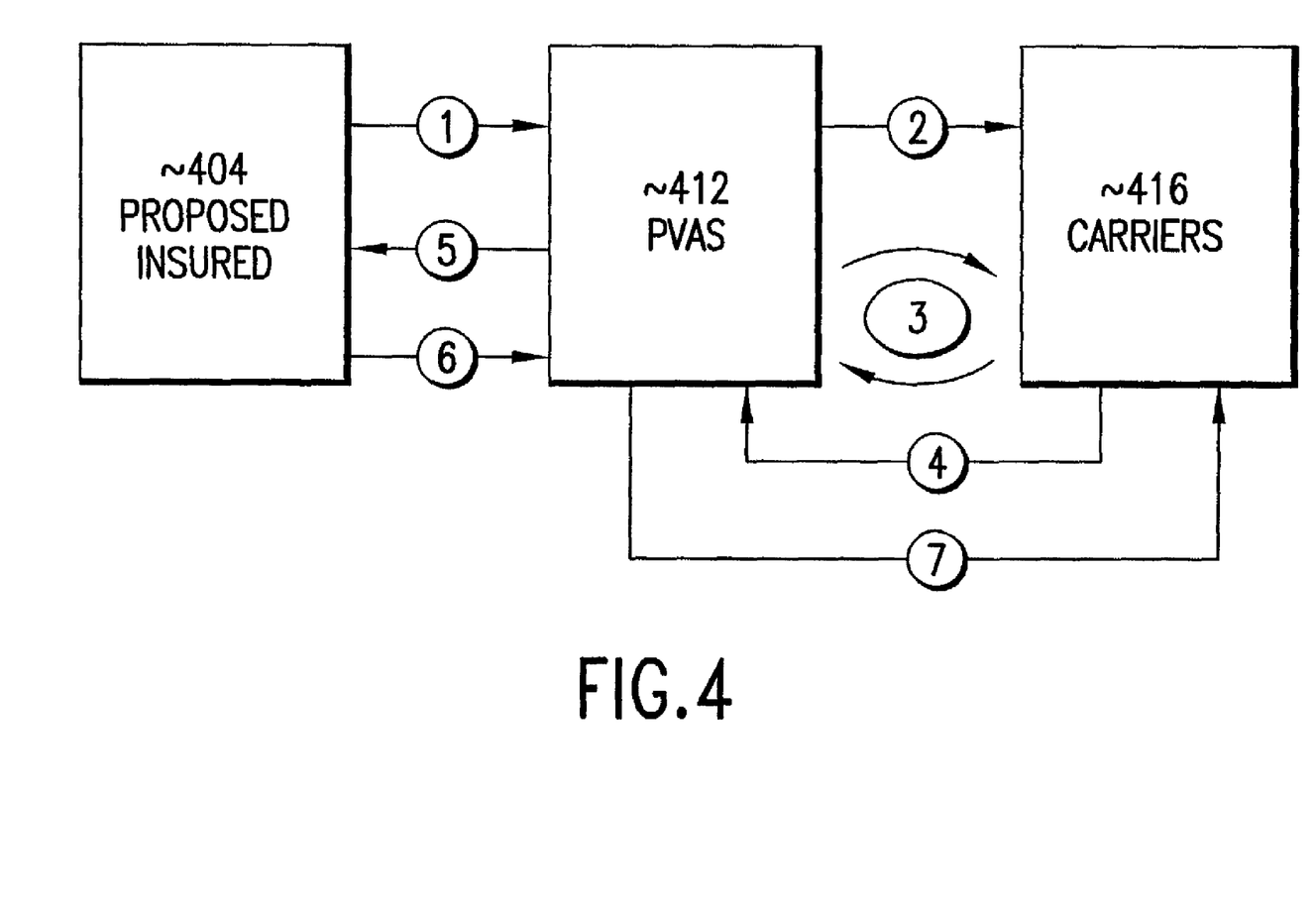
FIG. 4 is a block diagram that illustrates an embodiment of the present invention for a policyholder to query a product value appraisal system without the aid of a distribution channel.

As shown in FIG. 4, it is possible for an entity including a consumer seeking a financial product, for example, a life insurance policy, to invoke the product value appraisal system 412 without the aid of a distribution channel. As shown in step 1 of FIG. 4, a party seeking a financial product, the proposed insured, 404 contacts the product value appraisal system 412, typically via a website interface. The proposed insured 404 provides to the product value appraisal system 412 information necessary to appraise the total value proposition of the type of product in which the proposed insured 404 is interested, e.g., a life insurance policy. This information provided by the proposed insured includes demographic information and information for developing a risk profile of the proposed insured 404 for the product to be evaluated. Demographic and risk profile data may include, for example, the proposed insured's age, sex, smoking habits, basic income and net worth information. Information necessary to analyze the proposed insured's needs and financial suitability also is transmitted. The type of product being considered as well as the financial need of the end consumer or the proposed insured that will be met will also be transmitted. A knowledgeable proposed insured may also provide information about the insurance policy sought, including the proposed premiums to be paid and the proposed benefits to be provided. The proposed insured may also include information as to preferred carriers.

Then, the product value appraisal system 412 initiates bidding and/or invite proposals from interested product providers or carriers 416 by sending a proposed opening bid or invitation for proposal to participating insurance carriers 416, as illustrated by step 2 of FIG. 4. The opening bid provided by the product value appraisal system 412 may include an opening price with a minimum product rating.

After initiating bidding or inviting proposals, the product appraisal system 412 proceeds in an on-line, real-time, iterative process with the insurance carriers 416, as illustrated by step 3 of FIG. 4. The insurance policy proposals solicited by the product value appraisal system 412 are tailored to the proposed insured's risk profile, individual needs, and financial suitability. Upon receipt of a bid or proposal from a participating insurance carrier 416, the product value appraisal system 412 reviews each bid or proposal and rates the bid or proposal and the pricing of each bid or proposal.

With each product proposal, the carrier 416 will transmit information about the price and benefits of its product along with identifying information about itself. This data includes data about the product's proposed benefits and price on both a guaranteed and illustrated basis, and information about the insurance company proposing the product. Product data include the proposed premiums to be paid and the proposed benefits to be provided, both distinguished between guaranteed amounts and illustrated amounts that depend on assumptions about the future. The insurance company information includes data that quantifies the financial strength of the insurance company. The product value appraisal system 412 will use appropriate actuarial assumptions, such as mortality information specific to the end customer's risk profile, and traditional actuarial present value methodology to determine a numeric rating of the benefits offered in light of the proposed price. A rating, such as numeric and alphanumeric, will also be assigned to the financial strength of the product provider as well as to the suitability and affordability of the proposed product to the customer's circumstances. These three ratings will then be weighted to arrive at an overall rating of the customer value proposition.

Thus, the product value appraisal system 412 simultaneously solicits, prices, and rates, insurance policy proposals from insurance carriers 416. Soliciting, rating and pricing insurance policy proposals are conducted in an iterative process. This process is preferably conducted in real-time and continues until optimal product pricing and product ratings have been obtained. Although each insurance carrier can make one proposal at a time, multiple proposals can also be made by each carrier to generate multiple ratings with multiple prices.

The product value appraisal system 412 continues to provide feedback to the insurance carriers 416, including rating information and whether the carrier's current bid or proposal meets the customer's minimum requirements. The insurance carrier can then provide a new bid or proposal, taking into consideration the feedback from the product value appraisal system 412. If the insurance carrier believes that its proposal is final, e.g., that it cannot submit a more competitive bid, it provides a final bid or proposal to the product value appraisal system 412.

Insurance carriers 416 transmit their final product proposals to the product value appraisal system, as illustrated by step 4 of FIG. 4. Proposals received from insurance carriers 416 must meet or exceed minimum product ratings established at the outset by the product value appraisal system 412. The ratings reflect the insurance product proposal's total value proposition to the proposed insured 404. The total value proposition of a life insurance product proposal takes into account the proposed insured's needs, financial suitability, and risk profile. It also reflects detailed information about the insurance product proposal, information on the insurer's financial strength, and information on current market prices.

The product value appraisal system 412 transmits rated product proposals to the proposed insured, as illustrated by step 5 of FIG. 4. This output includes an appraisal of the entire value proposition for the proposed insured 404. The appraisal takes such form as a numerical index, an alphabetic grade, or a descriptive phrase such as "superior," "above average," "average," "below-average," or "unacceptable." Appropriate explanatory comments may accompany this information.

Next, the proposed insured 404 may make a purchase decision and communicate that decision to the product value appraisal system 412, as illustrated by step 6 of FIG. 4. The proposed insured's purchase decision flows back to the insurance carriers 416 via the product value appraisal system 412, as illustrated by step 7 of FIG. 4.

Figure 5:
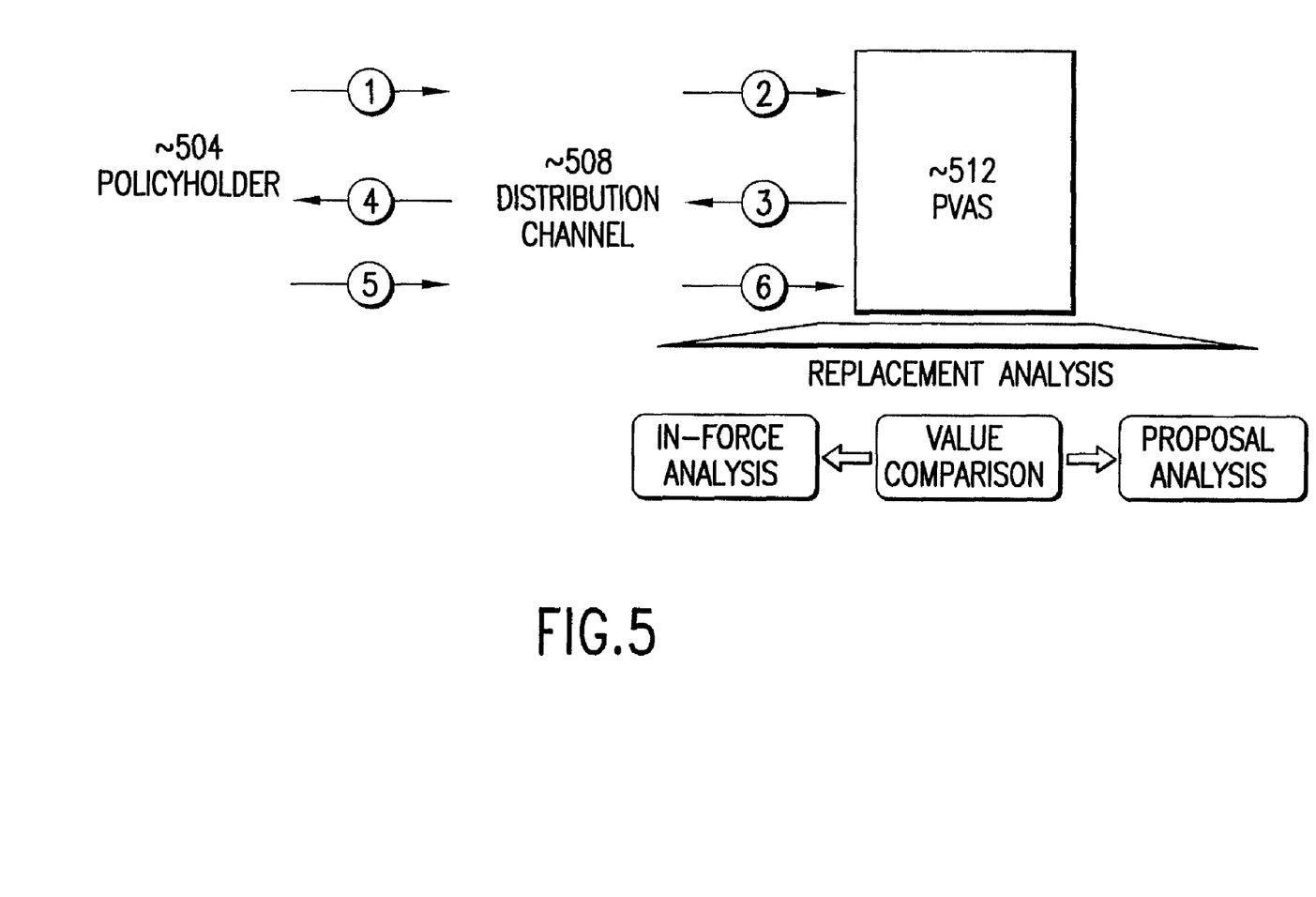
FIG. 5 is a block diagram that illustrates an embodiment of the invention appraising the value proposition for replacing an in-force policy.

FIG. 5 illustrates an embodiment of the invention appraising the value proposition for replacing an in-force policy. As shown in FIG. 5, it is possible for the holder of an existing policy to query the policy appraisal system or product value appraisal system 512 to appraise the value of the in-force policy and also appraise the value proposition for replacing the in-force policy. As shown in FIG. 5, step 1, the policyholder 504 contacts a distribution channel 508 to assist in obtaining such appraisal. The distribution channel then contacts the product value appraisal system 512, as shown in step 2.

The product value appraisal system 512 then collects, processes and uses available information on the insurance policyholder, the in-force policy, and the insurance company that issued the in-force policy to rate the performance of the in-force policy. The product value appraisal system 512 uses appropriate actuarial assumptions, such as mortality information specific to the end customer's risk profile, and traditional actuarial present value methodology to determine a numeric rating of the benefits offered in light of the price. A rating including numeric and alphanumeric is assigned to the financial strength of the product provider as well as to the suitability and affordability of the in-force product to the customer's circumstances. These three ratings will then be weighted to arrive at an overall rating of the customer value proposition. Information regarding the rating and value proposition are transmitted to the policyholder 504 via the distribution channel 508.

The product value appraisal system 512 also conducts a similar appraisal for a proposed replacement policy. If requested by the policyholder 504 via the distribution channel or by the distribution channel 508, the product value appraisal system 512 can solicit insurance policy proposals from insurance carriers in the iterative processed described with regard to FIG. 1. Similarly, the policyholder 504 may provide information regarding the replacement policy under consideration to the product value appraisal system via the distribution channel 508, as illustrated by steps 5 and 6.

Although FIG. 5 illustrates a policyholder invoking the product value appraisal system via a distribution channel, it is possible for the policyholder to contact the product value appraisal system directly to conduct an analysis of an in-force policy and appraisal of the value proposition for replacing the in-force policy.

Figure 6:
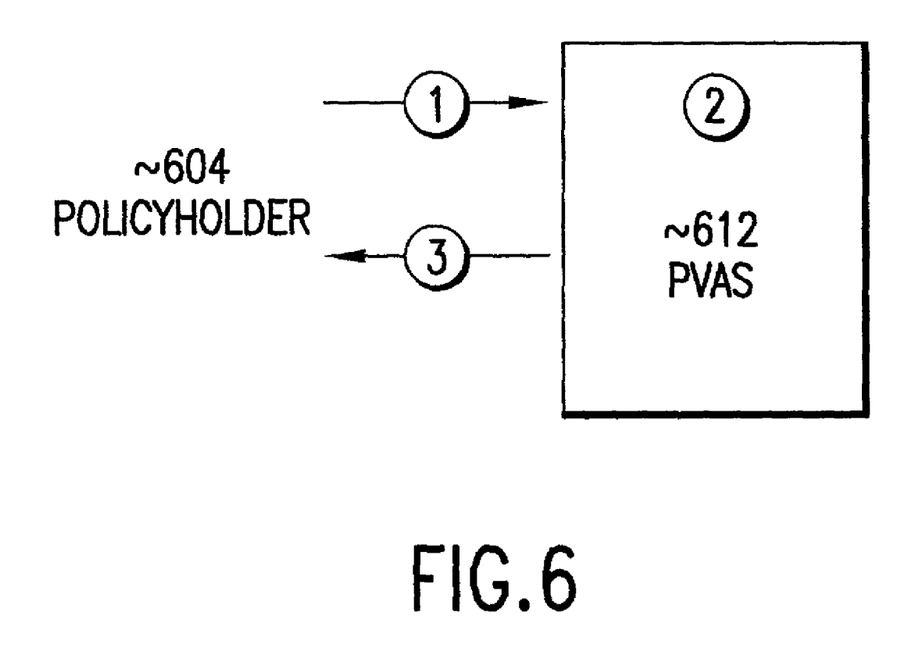
FIG. 6 is a block diagram that illustrates an embodiment of the present invention for a policyholder to query a product value appraisal system for rating an in-force policy.

As shown in FIG. 6, it is possible for the holder of an existing policy to query the product value appraisal system to value the in-force policy without the aid of a distribution channel. As shown in FIG. 6, the policyholder 604 contacts the product value appraisal system 612, for example, via a website. The product value appraisal system 612 then collects, processes and uses available information on the insurance policyholder, the in-force policy, and the insurance company that issued the in-force policy to rate the performance of the in-force policy.

Further, if requested by the policyholder, the product value appraisal system 512 determines the value proposition involved in replacing the in-force policy. If a valuation of a replacement policy is requested, the process proceeds in a manner similar to that process described with regard to FIG.

4. For example, the valuation system solicits, auctions and rates replacement insurance policy proposals to compare their value proposition to that of the in-force policy. Second, the invention calculates whether replacing the in-force policy would create value for the policyholder, particularly in view of the existing in-force policy.

Revenues for use of the product value appraisal system are generated from subscription fees from financial service product providers for participation in the auction process, transaction fees from the providers for the processing of bids and appraising the customer value proposition of proposals submitted, transaction fees from the distribution channel to receive the output from valuation system, and data subscription fees from the product providers to access the market intelligence data that will accumulate over time. Moreover, the valuation system may be provided as value-added services to the distribution channels, or to consumers directly, who pay a fee to use the service.

An example of the valuation system of the present invention is provided. John Consumer is reviewing his estate plan with his personal, fee-based financial advisor. The advisor recommends the purchase of an additional $500,000 of life insurance in an irrevocable trust to replace assets transferred to a Charitable Remainder Trust. Because it is not known when Mr. Consumer will die, a permanent (as opposed to term) form of insurance is recommended. Following some discussions of the various forms of permanent coverage, it is agreed to seek the best available universal life product to fill the need.

The financial advisor then goes on-line to the web site, which places the financial advisor in contact with the product value appraisal system and commences a search for the best value for his client using the value appraisal system. In this example, the distribution channel is the financial advisor. As the distribution channel, the financial advisor, in response to prompts by the web site interface, enters the following information which is transmitted to the product value appraisal system: (1) risk profile data about John Consumer including, inter alia, his present age (50), sex (male), and smoking status (non-smoker); (2) the purpose of the proposed insurance (asset replacement to preserve his estate); (3) basic income ($150,000 per annum) and net worth ($1,250,000) information for Mr. Consumer; and (4) face amount and type of product for which proposals are desired ($500,000 of universal life insurance).

The website receives the information and invokes the product value appraisal system, which opens an on-line, real-time proposal solicitation process for interested carriers. These proposals include, inter alia, policy illustrations showing the target premiums, guaranteed and illustrated benefits and cash values at select points in the future, and identifying information about the proposing carrier. The product value appraisal system conducts an overall appraisal of the proposals received.

Using the risk profile data, an appropriate mortality table is selected. Using this mortality table and appropriate expense assumptions, "fair" benefits and cash values are calculated for Mr. Consumer using standard actuarial formulas. Points are assigned to the ratio of the proposed guaranteed and illustrated values to the "fair" values at each point in time. The resulting point totals are weighted and totaled to arrive at a total initial rating. Additional points are added or subtracted from this initial rating based on, for example, the financial strength of the carrier, and the pattern of emergence of the proposed values over time. For example, "The Bragg Index" by John M. Bragg and Associates, Inc., 1995, may be used for this type of analysis.

The product value appraisal system then determines a point assignment for the appropriateness of the product to the identified need and also the relative affordability. In this case, because of the strength of the guarantee considered as a part of the process in item 1, the maximum number of points is assigned for suitability. The maximum number of points is also assigned for affordability because the target premium of $2,000 per annum is less then 2% of Mr. Consumer's income.

The three resulting ratings are then assigned appropriate weights to arrive at an overall rating. The overall rating and appropriate comments including, inter alia, the strength of the carrier, the appropriateness of the proposal from a suitability and affordability standpoint, and comments about the pattern of cash values and strength of guarantees are transmitted to the financial advisor for each proposal. The financial advisor provides this information, along with any other information he deems pertinent, to Mr. Consumer, and a purchase decision is made.

After a purchase decision is made, that information is transmitted back to the value appraisal system to become a part of the market intelligence database and to the "winning" carrier. The value appraisal system will also be able to transmit an on-line application for the selected product to the winning carrier.

Although the present invention has been discussed specifically in terms of a life insurance, other examples of financial products are contemplated by the present invention including other types of insurance products such as disability income insurance, long-term care insurance, medical expense insurance, supplemental health and accident insurance, auto insurance, homeowners insurance and other forms of liability insurance.

It will be apparent to those skilled in the art that various modifications and variation can be made in the system for appraising a financial product of the present invention without departing from the spirit or scope of the invention. Thus, it is intended that the present invention cover the modifications and variations of this invention provided they come within the scope of the appended claims and their equivalents.

What is claimed is:

1. A method of evaluating a plurality of insurance products, comprising:

receiving, by a computer-based value appraising system, information about a proposed insured, including risk profile information of the proposed insured;

receiving, by the computer-based value appraising system, information about a plurality of proposed insurance products that are tailored to the risk profile information of the proposed insured, the received information including proposed benefits to be provided and proposed price to be paid for each of the proposed insurance products, including information about the products' proposed benefits and price on both a guaranteed and illustrated basis that depend on assumptions about the future;

receiving, by the computer-based value appraising system, information about a financial strength of one or more insurers providing the proposed insurance products;

for each proposed insurance product, determining, by the computer-based value appraising system, an overall numeric rating reflecting the proposed insurance product's customer value proposition (CVP), wherein the determination is based on the risk profile information of the proposed insured, guaranteed and illustrated amounts of the benefits and price information of each of the proposed insurance products, and the financial strength information of the one or more insurers providing the proposed insurance products; and transmitting an appraisal of the proposed insurance products based on the determined overall numeric ratings of the proposed insurance products.

2. The method of claim 1, further comprising transmitting at least one solicitation for proposed insurance products based on the received information about the proposed insured.

3. The method of claim 2, wherein receiving the information about the plurality of proposed insurance products includes receiving a plurality of proposals for providing a insurance product based on the at least one solicitation.

4. The method of claim 3, further comprising receiving a selection of one of the proposals based on the transmitted appraisal.

5. The method of claim 4, further comprising transmitting the selection to the insurer corresponding to the selected proposal.

6. The method of claim 1, wherein the information about the proposed insured is received via a website interface.

7. The method of claim 1, wherein the information about the proposed insurance products is received from the insurers of the proposed insurance products.

8. The method of claim 1, wherein the information about the financial strength of the one or more insurers providing the proposed insurance products is received from the insurers of the proposed insurance products.

9. The method of claim 1, wherein the appraisal is transmitted to the proposed insured.

10. The method of claim 1, wherein the transmittal takes the form of at least one of a numerical index, an alphabetic grade, or a description phrase.

* * * * *